(12) United States Patent
Morales, Jr.

(10) Patent No.: US 9,811,523 B2
(45) Date of Patent: Nov. 7, 2017

(54) SYSTEM AND METHOD FOR PUBLISHING ONLINE POSTS

(71) Applicant: Leonard Morales, Jr., Scottsdale, AZ (US)

(72) Inventor: Leonard Morales, Jr., Scottsdale, AZ (US)

(*) Notice: Subject to any disclaimer, the term of this patent is extended or adjusted under 35 U.S.C. 154(b) by 285 days.

(21) Appl. No.: 14/688,697

(22) Filed: Apr. 16, 2015

(65) Prior Publication Data

US 2016/0306816 A1 Oct. 20, 2016

Related U.S. Application Data

(60) Provisional application No. 62/072,014, filed on Oct. 29, 2014, provisional application No. 62/072,027, filed on Oct. 29, 2014, provisional application No. 62/072,034, filed on Oct. 29, 2014.

(51) Int. Cl.
*G06F 3/0484* (2013.01)
*G06F 17/30* (2006.01)
*H04L 29/06* (2006.01)
*H04L 12/58* (2006.01)

(52) U.S. Cl.
CPC .. *G06F 17/30091* (2013.01); *G06F 17/30864* (2013.01); *H04L 51/32* (2013.01); *H04L 63/083* (2013.01)

(58) Field of Classification Search
CPC .. G06F 3/0482; G06F 17/3089; G06F 3/0481; G06F 17/30867; G06F 3/04817
See application file for complete search history.

(56) References Cited

U.S. PATENT DOCUMENTS

| | | | |
|---|---|---|---|
| 7,069,310 B1 | 6/2006 | Bartholomew | |
| 7,472,175 B2 | 12/2008 | Bartholomew | |
| 7,631,259 B2 | 12/2009 | Kirn et al. | |
| 8,015,263 B2 | 9/2011 | Bartholomew | |
| 8,353,012 B2 | 1/2013 | Del Real | |
| 8,402,099 B2 | 3/2013 | Von Werther | |
| 8,725,832 B2 | 5/2014 | Bartholomew | |
| 8,826,375 B2 | 9/2014 | Smith et al. | |
| 8,862,717 B2 | 10/2014 | Yerli | |
| 8,910,076 B2* | 12/2014 | Fernandez | 715/792 |
| 2005/0234921 A1* | 10/2005 | King et al. | 707/10 |
| 2007/0118801 A1 | 5/2007 | Harshbarger | |
| 2009/0217352 A1 | 8/2009 | Shen | |
| 2009/0234876 A1 | 9/2009 | Schigel | |

(Continued)

*Primary Examiner* — Namitha Pillai
(74) *Attorney, Agent, or Firm* — Venjuris P.C.

(57) ABSTRACT

Systems and methods for editing and publishing online posts and browsing published online posts published are disclosed. An exemplary system comprises a server such as a website and a database for storing posts and user profiles. The exemplary server provides user interfaces associated with a specific user and displayable in a remote user device. The exemplary user interface for editing allows the user to create one or more content containers in a post and easily change the containers' contents, positions, and even types. The exemplary user interface preferably automatically rearranges the positions and/or sizes of the containers to achieve a best viewing result. The exemplary user interface for browsing posts displays one or more posts based on the display mode, including a tile mode and a detailed mode, and viewing the contents of the post selected by the user.

13 Claims, 8 Drawing Sheets

(56) References Cited

U.S. PATENT DOCUMENTS

| | | |
|---|---|---|
| 2009/0265607 A1 | 10/2009 | Raz |
| 2011/0154434 A1* | 6/2011 | Hernacki .......................... 726/1 |
| 2012/0154444 A1* | 6/2012 | Fernandez .................... 345/655 |
| 2012/0162266 A1 | 6/2012 | Douglas et al. |
| 2012/0166496 A1 | 6/2012 | Lacey et al. |
| 2012/0259926 A1 | 10/2012 | Lockhart |
| 2012/0259927 A1 | 10/2012 | Lockhart |
| 2013/0097541 A1 | 4/2013 | Yerli |
| 2015/0026573 A1 | 1/2015 | Meng |
| 2015/0113441 A1* | 4/2015 | Felt et al. .................... 715/753 |

\* cited by examiner

SYSTEM AND METHOD FOR PUBLISHING ONLINE POSTS

BACKGROUND

In the digital age, the word "friend" has a new meaning. People "meet" new friends and build their social or professional networks online. These online "friends" may be connected by common relations, interests, activities, or backgrounds and regularly communicate with each other through their posts. Famous social and/or professional networking websites include Facebook™, Instagram™, LinkedIn™, Skype™, and Twitter™, each of which comprises hundreds of millions of users worldwide. However, posts on existing networking websites are sometimes called "microblogs" since they generally are simple and short. For instance, a post in Facebook™ comprises only simple texts, URLs, and/or photographs. Therefore, the editing functions on these sites are generally limited. For a travel blogger who likes to share with her friends her blogs with a lot of pictures, descriptions, and sometimes video clips, she has to maintain at least two user accounts—one for blogging on a traditional blogging site and the other on an online networking site for sharing the blogs. A company that would like to promote a campaign also needs to direct traffic from an online networking site to their company website where they can provide more information about their campaign. Maintaining multiple system accounts and creating multiple posts on different websites for the same contents is counterproductive. Therefore, a system for blogging while providing social/professional networking features is needed.

Additionally, online networking sites generally list posts in a reverse chronological order. If a user has an online friend who constantly posts new updates and the user does not read all new posts in time, the user would be overwhelmed by new posts by that friend and need to dig into all the posts to find anything that might really be of interest to the user. Although most online networking sites provide search functions, the user need to know what to look for before searching. Therefore, it is desirous to have an online networking system where posts are displayed in a compact fashion with their contents easily identified.

Finally, with the increase in users' privacy awareness, users are intimidated to share posts and contents online because either the privacy settings are hard to understand or the privacy settings are not what they seem to be. For instance, even if a user shares with her "Friends Only" a post including a photograph on Facebook™, anyone tagged on that photograph, even if not a friend, can see the post. Though it purportedly protects the third person's privacy, the setting simply is not what it is supposed to be. Therefore, it is desirous to have an online networking system that provides easy-to-understand privacy settings—posts and contents shared with friends only remain accessible only to the friends and no one else.

SUMMARY

The structure, overall operation and technical characteristics of the present invention will become apparent with the detailed description of preferred embodiments and the illustration of the related drawings as follow.

The invention is incorporated in systems and methods for editing and publishing online posts and browsing online posts shared in online networking environments. An exemplary system for editing, publishing, and browsing online posts comprises a server such as a website and a database for storing posts and user profiles. The exemplary server provides a user interface associated with a specific user and displayable in a remote user device. The user may have a system account, and therefore a corresponding user profile in the database, based on which the exemplary system may personalize the user interface associated with the user and optionally promotes featured posts that may be of interest to the user. Preferably, the exemplary system also provides a user interface for guest users, that is, users without any associated system accounts, to browse and read posts published without any limitations, but not to create anonymous posts.

Systems and Methods for Editing and Publishing an Online Post

An online post in the exemplary system has at least one or preferably multiple content containers. The system preferably provides templates for creating new posts. Alternatively, the user may create a post from scratch. The user interface of the exemplary system allows the user to add, delete, and modify a container, including resizing and repositioning the container by a user command, such as drag-and-drop by a pointing device.

Each container in an exemplary post comprises a plurality of editable features and controls for changing the features, saving the container to the database, and deleting the container (preferably including any contents in the container) from the post. The features of an exemplary container include a container type, at least a content, a container dimension, and a container position in the post. This exemplary system may include various types of containers, such as an image container, a video container, a remote media container, an audio container, an audio recorder container, a text editor container, a document viewer container, an attachment container, an image gallery container, a contract signing container, and an online meeting container.

In order to save the size of a post, rather than putting the actual media files in the containers of the post, the exemplary system uploads media files to the database and incorporates visual representations with hyperlinks of the media files in the containers. Each content in the exemplary system has a body and a link. A content body may, based on the type of the container, be a text, a code embedded in the container for streaming a video clip from another server, a list of attachments saved in the database, a thumbnail of an image file uploaded to the database, an input box for receiving a reply from a recipient, an embedded instant messaging plug-in, and so forth. In the exemplary system, if a container includes at least one file such as a media file or a document saved to the database, the container has an uploading control that uploads the file to a file location in the database, and adds a new content to the container to be associated with the file.

The exemplary system preferably hides the file location in the published post in order to protect the user's privacy by generating a virtual location of the file as the link and maps the link to the actual file location when the file is to be retrieved. For example, an embodiment may implement this protection by randomly creating a unique link and saving the link and its associated file location in a table. When the file is to be accessed, the embodiment looks up the file location associated with the link in the table and delivers the file. Another embodiment may generate the link based on an algorithm that uniquely creates the link from the file location, and reverse the algorithm to get the file location based on the link. A person in the art would know that any mechanisms that can uniquely map a link of a content (a virtual location) to the actual file location and vice versa may be adopted.

Some container types in this exemplary system may be changed by the user while editing. Changing a container type may affect other features and/or controls of the container. For instance, changing a container type from a text container to an image gallery container removes the preexisting text content, affects the maximum number of contents, and adds an uploading control to the container for copying at least one image file from a user device to the database. Other examples of type-specific controls may include a saving control for a text container, a recording control for an audio recording container, an add-signer control for a contract signing container, and so forth.

A post in the exemplary system further comprises a tile for representing the published post. The tile includes a visual identifier preferably associated with the contents in the post. An embodiment of the system may allow the user to select among one or more graphics preexisting in the database, an icon automatically generated by the server based on the contents, and an image to be uploaded by the user. Another embodiment may automatically designate in the post a primary content, and then generate the visual identifier based on the primary content. For instance, when one or more image files are uploaded to the database, the server in the embodiment may determine that the first image uploaded to the database is the primary content of the post and create a thumbnail of the first image to be the visual identifier of the tile.

A preferred embodiment may not allow any overlap between two or more content containers. The user interface for editing a post in the preferred system may let a user freely move containers in the post while automatically detects potential overlaps and dynamically changes the positions of the containers when necessary. For instance, if the user drags a first container from the bottom of the post and hovering over a second container originally on the top of the post, the exemplary system may, before or after the user drops the first container, move all containers, except the first one, towards the bottom and leaves a space sufficient for the first container.

In addition, the containers in an embodiment preferably align vertically. A user interface in the embodiment may automatically rearrange the container positions to vertically align to the top of the post when any changes to a container are likely to cause an empty space among the containers. For example, when the user deletes a container or reduces the container's dimension, the containers located below the deleted/modified container are moved upward in the post, if possible, to fill in the empty space left by the deleted/modified container.

Moreover, an embodiment may include a maximum width of a post for a best post viewing result. The maximum width may be predetermined by the system, the user, or an administrator. When the user causes the width of the post greater than the maximum width by moving a container outside the area of the post, the embodiment preferably automatically moves the container back into the allowed area. If alternatively the issue is caused by resizing the container to have a new width, the embodiment preferably either changes the width of the container to the maximum width of the post when the new width is greater than the post's maximum width or moves containers in the post to accommodate the change.

An embodiment of the system may include a self-destruct timer associated with a post that deletes the post after a period of time predetermined by the user. This feature allows the user to control how long the post is available for others to see or find. Preferably, the self-destruct timer also removes every file uploaded to the database and associated with the content of a container in the to-be-deleted post to ensure that no one can access the files after the post is deleted.

An embodiment of the system may allow the user to define a privacy setting of a post, including whether it can be accessed by the general public (a public post) or by a specific person or a predetermined group of people (a private post). For a private post accessible to one or more predetermined allowed viewers, the embodiment may publish the post by sending a notice such as emails with the author's name and a hyperlink to the post to the allowed viewers. When an allowed view click's the hyperlink of the post in the notice, the embodiment verifies the identity of an allowed viewer before showing the post. For an embodiment that allows only a viewer with an associated system account to access a private post, the identity is the associated system account. If in another embodiment, any recipient of the notice is allowed to access a private post, then the account of the viewer can be the allowed viewer's email address (or phone number, depending on how the notice reaches the allowed viewer). The term "an allowed viewer" may also mean a predetermined designation of multiple people (a group) who have associated accounts in the embodiment.

In an alternate embodiment, the identity of an allowed viewer may further include an IP of the allowed viewer's device. The embodiment may have a blacklist of IPs such as those for bots or automatic programs and block access from the allowed viewer if the allowed viewer's IP is found in the blacklist. The embodiment preferably automatically retrieves the viewer's IP when he/she clicks the hyperlink by measures known in the art, such as incorporating an IP grabbing script in the hyperlink.

To better protect the privacy of users, an embodiment may have an idle timer that activates when an inactivity during editing is detected. After a predetermined idle timeout, the user interface for editing a post in the embodiment is locked, and the user is required to unlock the system by various measures, such as re-login. Another embodiment may lock a published private post by a password set by the user or generated by the system. If the password is machine generated, the embodiment may send the generated password to the user by an email, an SMS message, or any kind of notice so that the user may forward the password to the allowed viewer(s).

In addition to the user verification mechanism that is common in the art by comparing the system account and password of a user with those in the user profile, an embodiment may further provide a two-step account verification mechanism that preferably can be activated or deactivated by the user. The embodiment with the two-step account verification feature activated for a user would, before the common log-in process begins, send a code generated by the server to the user via a predetermined notification means, such as an email or an SMS text message, and verify the code received from the user interface. Preferably, the user may ask the embodiment to resend the code if the user fails to receive the previous email or text. If the code entered matches the code generated, the embodiment may then allow the user to use the system account and password to log in.

Finally, when a post is published on the server, per the user's command, instead of sending a notice with a hyperlink, an embodiment may send the post to a predetermined group of recipients. For instance, the post itself may become an email message sent to all the email accounts in the user's member/subscriber list with a post title as the email subject. As such, the user may enhance the chance that a post is read when some members/subscribers are reluctant to click a hyperlink in the publication notice. In addition, even in an embodiment that every viewer must have a system account, if the user so desires, the post may be available to all recipients with or without system accounts.

Systems and Methods for Browsing Published Posts

The exemplary system for displaying online posts to an authorized user shows the posts that the user has access to, according to the display mode of the user interface predetermined by the user or the system. As stated above, guest users may have access to the public posts in an embodiment while system users may in addition see private posts created by or shared with them. The display mode may include a tile mode and a detailed mode.

In the tile mode, the exemplary user interface may be divided into a plurality of columns of the same width, and the posts are represented by their corresponding tiles. Like the tiles previously described, a tile in an embodiment for displaying one or more posts may be selected by the author of the post or created automatically by the embodiment based on the contents in the post at the time the post is published. In the user interface of this embodiment, each tile is located and resized proportionally, if necessary, to fit in a column. The tiles in each column is preferably aligned vertically so that the user can see as many tiles side by side and, based on the tiles, quickly find a post that seems intriguing to the user.

In the detailed mode, the exemplary user interface displays the one or more posts in a table with rows corresponding to the posts. Each row in the exemplary interface has one or more columns for displaying one or more features of its corresponding post. In an embodiment, features of a post may include the post's author, title, size, tag(s), category(ies), comment(s), date posted, whether there is at least one attachment, the privacy setting such as whether it is public or private and/or who else can view it, and so forth. Features may be displayed by texts, graphics, or both. For instance, in a preferred embodiment where the title of a post is shown in text and whether the post is public or private is indicated by an icon, the author of the post is shown by an image next to the author's system ID.

When the user selects a post in the user interface of the exemplary system, the post is retrieved from the database, shown in the user interface with the containers laid out in the post exactly like how the author saw it before publishing. Every content in the post may be concurrently delivered to the user interface as is or by a visual identifier of the associated uploaded file. For instance, in the preferred embodiment a post with a video container on the top left, and an image gallery container on the top right, and a text container at the bottom is shown with description may be shown with an embedded video player for streaming the video clip on the top left, thumbnails of the images in the image gallery container on the top right, and the text description displayed at the bottom. When the user clicks a low-resolution thumbnail of an image in this exemplary user interface, a new user interface such as a new window or a new tab of the user's browser pops up and the original image is downloaded from the database and displayed in the new window or tab. Similarly, if the user clicks the video player, the video player starts streaming the video clip from the database.

As described above, the posts in this exemplary system may be public or private. When a post is private, that is, shared by the author with an allowed viewer, the embodiment may determine whether the user is the allowed viewer by verifying the user's identity as described above. If an allowed viewer is a designation of multiple people such as a group of system accounts, then the user can access to the post only if the user is one of the people in the designation.

In an embodiment that a post accessible to the user may have a self-destruct timer for removing, after a predetermined timeout, the post and/or the uploaded files associated with the contents in the post, the embodiment may update the user interface periodically and remove the representation (such as a tile or a row) of the post deleted by the self-destruct timer from the user interface. An alternate embodiment may not update the user interface at all until the user selects the deleted post or the user interface is manually refreshed.

An embodiment of the system may provide searching, filtering, and/or sorting mechanisms for a user to choose which of the posts to show and in what order in the display mode. The searching, filtering, and/or sorting in the embodiment may be based on criteria associated with one or more features of the posts, such as authors, titles, publication dates, tags, categories, post sizes, privacy settings, contents, comments, and so forth. For instance, the user may request the embodiment to search for posts with a search term "football," and then the user interface shows the posts that the user has access to and have "football" in the post such as the author's name, titles, tags, contents, or comments. An alternate embodiment may further comprise a module for determining terms related to the search term "football," such as "NFL," "sport," "Arizona Cardinals," and so forth, and show posts that not only have the exact search term but the terms related to it.

Similarly, when the user of the embodiment chooses to filter out the posts that don't have a specific term in a feature such as "race car" in the tags, the embodiment may show only posts that have the exact term and/or terms related to it in at least a feature. An embodiment with a sorting function may allow the user to sort the posts accessible to the user based on a feature in an ascending or descending order, such as sorting the posts from A to Z based on the author's last name.

Furthermore, an embodiment may have a user preference setting in a user profile. The user interface for this embodiment may allow the user to set his/her user preference setting by choosing categories of posts of his/her interest among preexisting keywords, such as "sports," "shopping," "politics," "science," and so forth. In an alternate embodiment, the user preference setting may additionally be updated regularly by the embodiment that monitors user behaviors such as browsing, posting, searching, or selecting posts and determines a user preference based on user preference mining techniques known in the art.

If a user preference setting is found in an embodiment, the embodiment may determine, based on the user preference setting, the user preference rating of each of the posts that the user may access. For instance, in an embodiment with a 1-10 scale user preference rating, when the tag of a post contains a keyword "fishing" that matches exactly a term in the user preference setting, the post may be given a rating of 10, and if fishing is not in the user preference setting but is considered 30% similar to "sports" in the user preference setting, then the rating may be 3. Another embodiment may adopt a more complicated measure known in the art for determining the rating of a post based on how related the features of the post and user preference setting are. The features used for determining the rating may include the post's title, texts, tags, or even attachments.

Another embodiment may in addition have image recognition mechanisms for identifying objects in an image, icon, or video in a post and further use the identified objects to determine the relevance of the post. After the ratings of the accessible posts are determined, the user interface may then show the posts based on their user preference ratings such as displaying the posts in a descending order of rating. Additionally, the embodiment may determine that the user are not likely to be interested in posts that have ratings below a predetermined threshold and remove these posts from showing in the user interface.

Additionally, in various embodiments for editing and browsing online posts, the database may comprise various storage devices, such as a cloud storage, a server storage device, a user's local storage device, or combinations thereof. In an embodiment, the server storage device may be a hard drive, a disk array, or any devices physically or virtually connected to the server. In another embodiment where a user's post can be stored in the user's local storage device physically or virtually connected to the user's computer, the user may have more control on how the allowed viewers can see the post. For example, the user/author may allow the viewers to access the post only through a company intranet in order to further protect the post or its contents. This can be achieved by various means, such as using a local file/database server in the intranet to work with the server of the embodiment, and the local server determines whether to provide the post to the viewer based on the IP of the viewer forwarded by the embodiment. Alternatively, the server of the embodiment may direct the viewer's request to the local server and let the user's firewall block unwanted traffic to the local server.

Finally, an embodiment of the system may in addition comprise a module for monitoring how viewers of a post respond to the post and provide the statistics and/or analysis to either the author or an administrator. The statistics and/or analysis module of the embodiment may provide the information to the author or an administrator of the system for marketing or surveillance purposes or as a feedback for system improvement. The statistics and/or analysis may be based on the embodiment's observations of the viewers' behaviors such as how often the post is selected for display, how often the post is saved, how often the post is forwarded/shared, how many comments are added in response to the post, and/or how the post is rated. The embodiment may adopt any data mining techniques or tools known in the art for analyzing the statistics collected.

One object of this invention is to provide an online post editing system where a user can easily lay out multiple contents from various sources, and a post published would be displayed exactly like what the user saw while publishing.

One object of this invention is to provide a system where a user can quickly find posts that the user may want to read.

An object of this invention is to provide a system where a user may share private posts with a limited number of people while the shared posts remain accessible only to the people he/she chooses.

Another object of this invention is to provide a system where a user can determine how long a post is available to others.

DESCRIPTION OF THE EMBODIMENTS

The preferred embodiments are illustrated in FIGS. 1-8. A preferred embodiment of the system for editing an online post for publishing in an online networking environment comprises a server and a database. The server of this embodiment comprises a user interface associated with a user. When the user requests from the user interface a post created, this server may prompt the user to select among multiple preexisting templates or allow the user to start from scratch. A template comprises a plurality of content containers laid out in a predetermined way. In this embodiment, even if a template is used, the user may still add, delete, or rearrange the content containers in the post. Alternative, if the user creates his/her own post, he/she may save the post as a template in this embodiment for future use as well.

Figure 1:
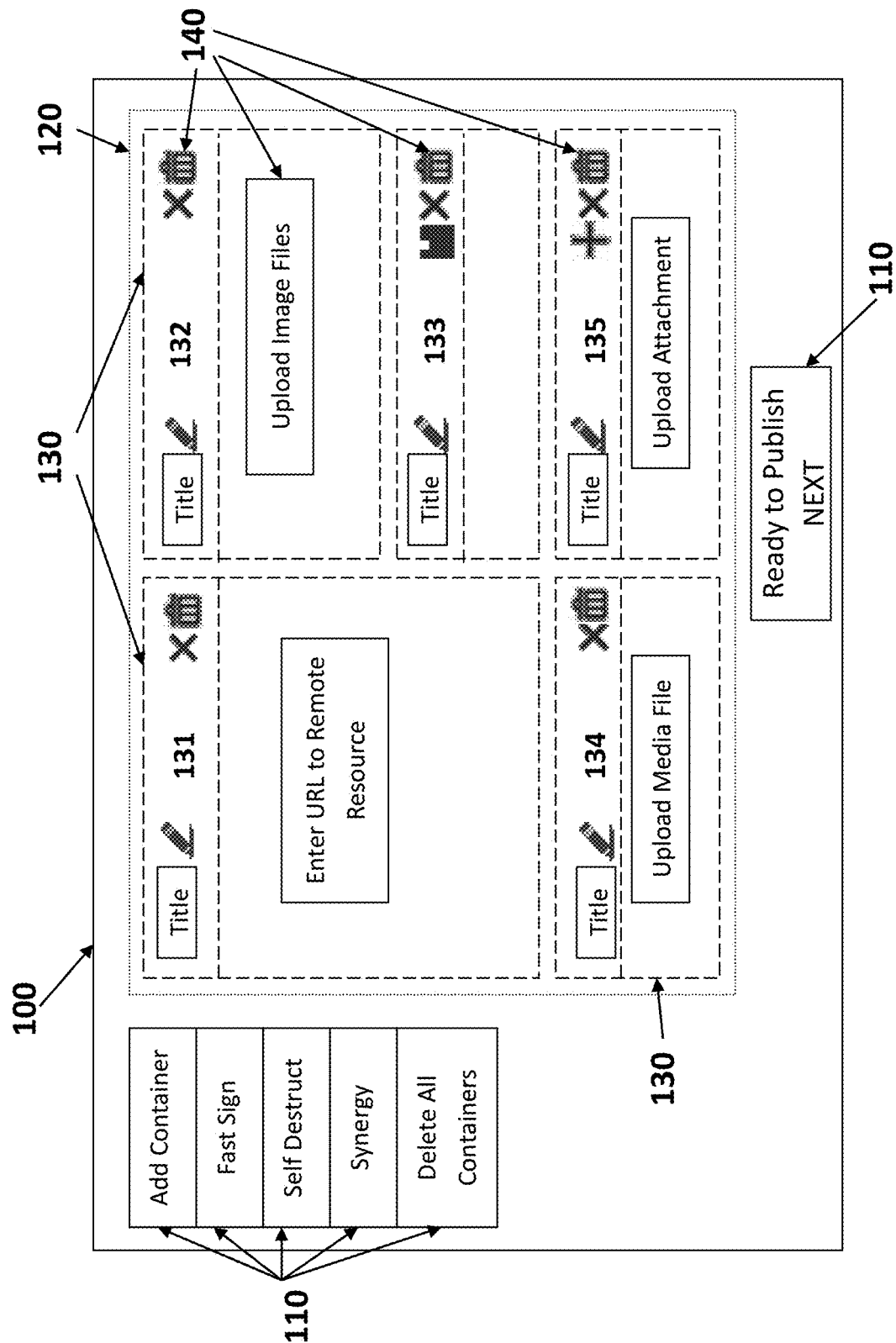
FIG. 1 shows a user interface of an embodiment for creating a post with multiple content containers.

In FIG. 1, the user interface 100 of the preferred embodiment has multiple post editing controls 110 ("Add Container," "Fast Sign™," "Self Destruct," "Synergy™," "Delete All Containers," and "Ready to Publish NEXT") and a post area 120 where the content containers 130 may be placed. Among the post editing controls 110 of this embodiment, "Add Container," "Fast Sign™" and "Synergy™" can be used to add new content containers to the post being edited. The "Self Destruct" control is used to set a self-destruct timer for this post. The "Delete All Containers" control can be used to remove all containers created in this post after confirming with the user. The "Ready to Publish NEXT" control is used to save the post after the user finishes editing the post.

In addition to fast sign containers created by the "Fast Sign™" control and synergy meeting containers created by the "Synergy™" control, this embodiment provides the following types of containers to be created by the "Add Container" control: featured images (see the container 134), image gallery (see the container 132), document viewer, text editor (see the container 133), description, upload raw video, add YouTube™ or Vimeo™ video (see the container 131), add audio, add attachment (see the container 135), website links, and audio recorder.

A fast sign container of this embodiment comprises an introduction box, a response option, a statement box, at least two pairs of signer name boxes and email boxes, an "Add Signer" control, and a "Delete" control. Except the signer information, all the contents have default values changeable by the user. The response option of the fast sign container has three default options—"I agree. Let's proceed," "Let's discuss. I would like to suggest changes," and "I do not agree." The introduction box and statement box comprises texts for introducing what the options are for and for informing the signers that a binding contract is to be formed. After publishing, a signer will receive an email concerning the post with the fast sign feature. The signer can review the document(s) in the post, if any, in the embodiment, choose among the response options, and sign electronically or by uploading a signature image.

A synergy meeting container of this embodiment comprises an instant messaging content and a video chatting content, both including embedded codes for text and video chatting through the server or in an alternate embodiment, a third-party server such as a Skype™ server. When a post with a synergy meeting container is published, the user (author) may initiate the meeting by inviting (sharing the post with) at least one other user of the embodiment to chat and/or discuss the other contents in the post, such as a proposal document, an art work the user created for the other user, or a draft of a contract uploaded to the server.

Content containers in this embodiment have various container controls 140 based on their types, such as the title changing control (✎), the type changing control (✘), the content saving control (💾), the container delete control (🗑), the attachment uploading control (✚), the "Upload Media File" control, and so forth. All types of content containers 130 in this embodiment have at least a title, a title changing control (✎), and at least a content (not numbered). Only content containers that can be created by the "Add Container" control in this embodiment have changeable types and comprise a type changing control (✘). When the user clicks the type changing control of a container, the type changing control lists types that the container can change to and clears the content(s) previously created/uploaded after a new type is selected. Then the embodiment resets the container with its new default features and controls.

Among all the types of content containers provided in this embodiment, a content container of anyone of the types: featured images (see the container 134), image gallery (see the container 132), document viewer, upload raw video, add audio, and add attachment (see the container 135) comprises an uploading control for copying at least a file from the user device to the database. After uploading, the uploading control creates a content in the container to be associated with the uploaded file and designates a link pointing to a virtual location that the server creates and uniquely maps to the file's real location in the database.

For each image uploaded in a "featured images" or "image gallery" container, a content of the container is associated with the image and contains a thumbnail of the image (or an image file of a smaller size and/or lower-resolution) as its body. The content in an "add attachment" container is a list of file(s) uploaded with its/their virtual location(s) in the embodiment. For a file uploaded in a "document viewer," "upload raw video," or "add audio" container, the embodiment determines the file type and associate a content of the container with the file by putting an embedded viewer/player code into the content's body to show/play the file. Like an "add audio" container, an "audio recorder" container comprises a content with a body of an embedded code for playing an uploaded audio, after the user records and uploads the audio file with a recording control.

The "text editor" containers and "description" containers each comprise a default content with an empty body. After the user keys in words in the container of these kinds, the user may click the "Save" control (💾) to save the content body. The only difference between a "text editor" container and a "description" container in this embodiment is that the "description" container further comprises a style panel with various controls, such as controls for setting text fonts, paragraphs, and/or sizes. The "add YouTube™ or Vimeo™ video" containers and "website links" containers, as their names suggest, comprise contents associated with resources from a remote source. The body of a content in an "add YouTube' or Vimeo™ video" container is an URL or an embedded video player code while the content of a "website links" container has a list of name-URL pairs for a viewer to link to.

Figure 2:
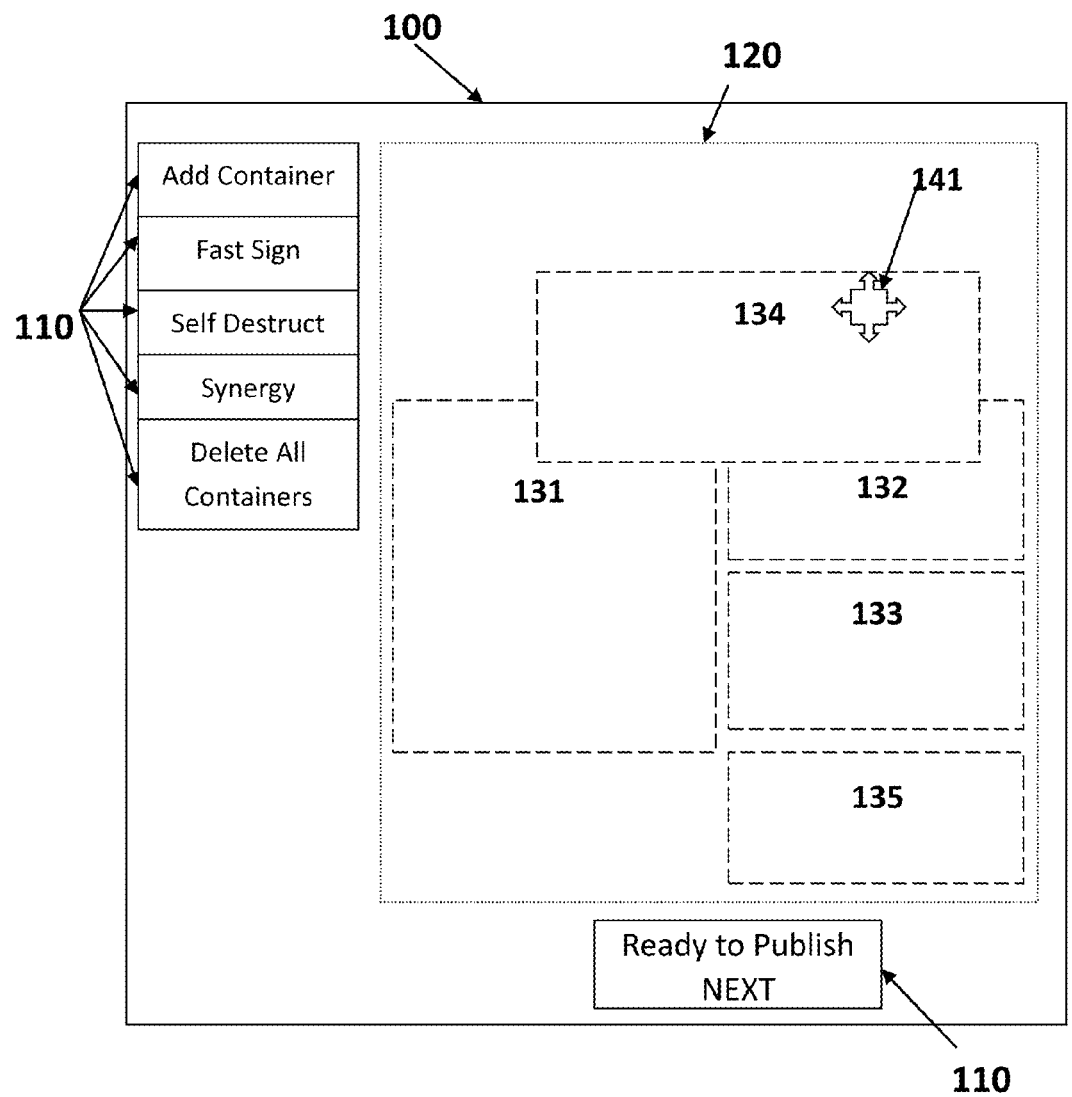
FIG. 2 shows the user interface of the embodiment when the user drags a container and moves it toward the top of the post being edited.
Figure 3:
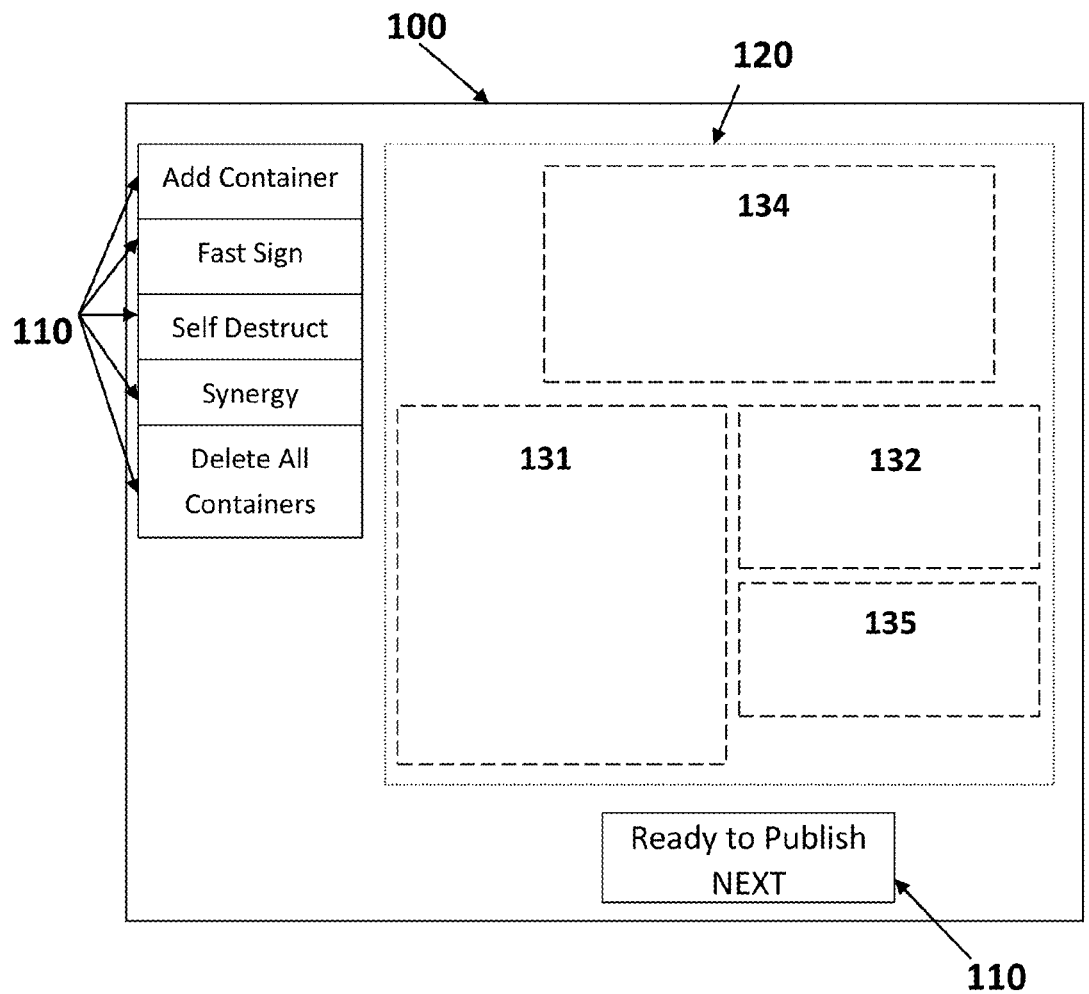
FIG. 3 shows the user interface of the embodiment after the user deletes a container.

As shown in FIG. 2, the user interface 100 further comprises a container control 141 (◆) for the user to drag-and-drop a container (134). The user interface 100 of this preferred embodiment automatically predicts, based on the movement of the container 134, where the container 134 is going to land and moves all containers (131 & 132) that may overlap with the moving container 134 as well as those (133 & 135) below the containers 131 & 132 toward the bottom of the post since the containers in this embodiment are aligned vertically to the top of the post. Alternatively, if only the container 131 would be affected by the container 134, the containers 132, 133 & 135 would remain where they are. Also because the containers 130 of this embodiment are aligned vertically to the top of the post, if a container 133 is removed as shown in FIG. 3, the container 135 originally beneath the deleted container 133 is automatically moved upward in the post.

Figure 4A:
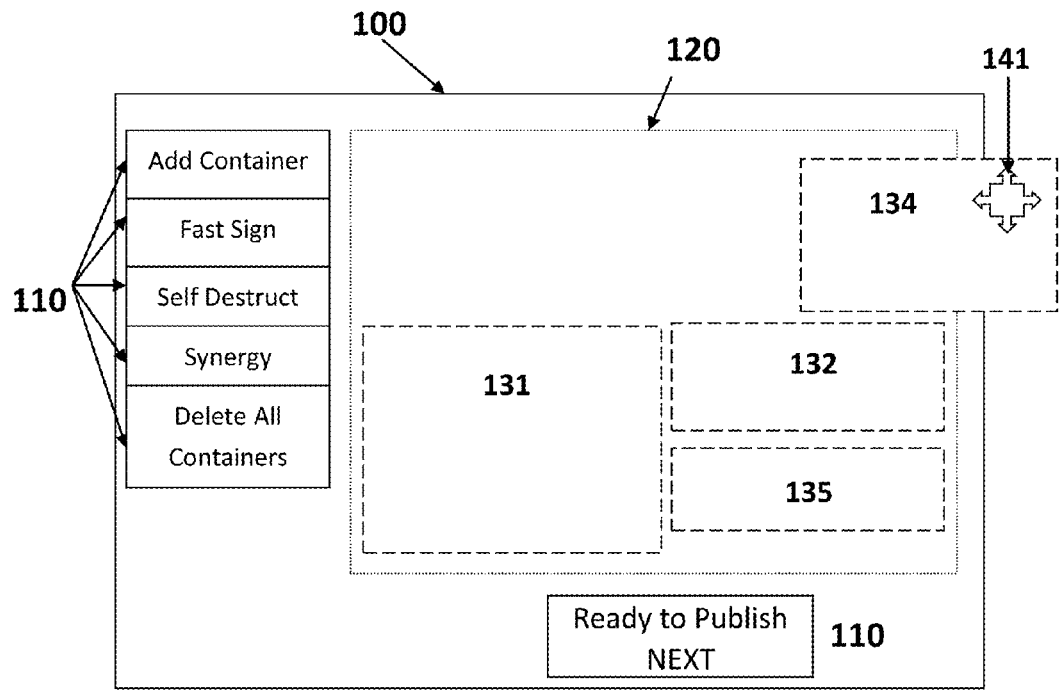
FIGS. 4A & 4B show the user interface of the embodiment when the user drags a container and moves it outside the post area with the maximum width allowed in the embodiment.
Figure 4B:
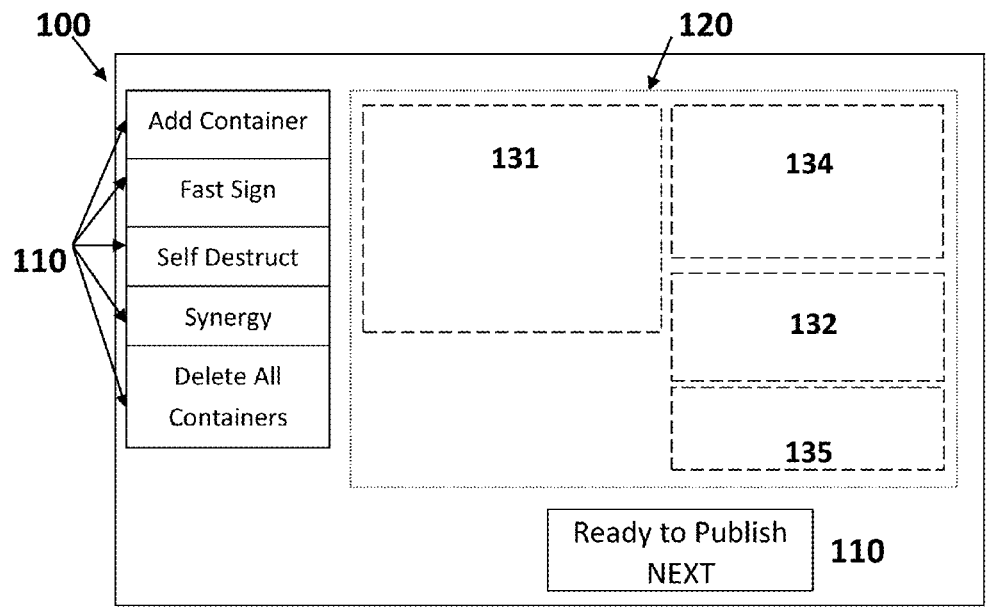

Additionally, the user interface 100 of this embodiment further comprises a maximum post width. If the user drags the container 134 toward left and outside the post area 120 with the maximum post width, as shown in FIGS. 4A & 4B, the user interface 100 of this embodiment would try to accommodate this change by moving the container 134 back into the allowed area 120 while keeping the container 134 at its leftmost position. Again, the user interface 100 automatically and dynamically rearranges the other containers 131, 132 & 135 that might be affected by the user command(s).

While the post is being edited, the user interface 100 of this embodiment further comprises an inactivity timer for determining how long the user interface 100 has been idle. If the user has been inactive for a period of time, predetermined by the embodiment, the user interface 100 would be locked and the user would need to log in again to continue editing. In an alternate embodiment, the user may determine how long the idle timeout is or disable the idle timer altogether.

As state above, after clicking the "Ready to Publish NEXT" control, the post is done with the editing. The user interface 100 would then request the user to provide the other features of the post: a privacy setting, a title, at least a tag, a visual identifier of a tile, and a file location. In this embodiment, the privacy setting can be public or private. The visual identifier can be chosen among graphics preexisting in the database of the embodiment, a thumbnail of the primary content determined by the embodiment, and a cover image uploaded by the user. The primary content of a post in this embodiment is the content of a featured image container or an image gallery container that is associated with the first image file uploaded in this post. If no image file has been uploaded, this option does not exist in this embodiment. An alternate embodiment may also allow the user to choose or enter at least a category of a post. Another embodiment may automatically determine the at least one category of a post based on the tag(s) the user enters.

After all these features are determined, the post is published according to its privacy setting. If the post is private, the user of this embodiment may now share it with a limited number of people by providing the email addresses of the allowed viewers or at least one designation of a plurality of the allowed viewers (a group, also known as a "scene" in this embodiment). In an alternate embodiment, this privacy setting may be first done before the post is published. The preferred embodiment will then send a notice with a hyperlink of this post to the allowed viewers by email. An allowed viewer must be a registered user to be able to access the private post in this embodiment. In another embodiment, the allowed viewer who is not a system user may be given a one-time password to view this specific post. In yet another embodiment, the notice itself may comprise the post so that the recipient of the notice does not have to log into the embodiment or go to a website. An embodiment may in addition checks the IP address of a viewer's device when the viewer tries to access a post in order to provide an extra security measure.

Figure 5:
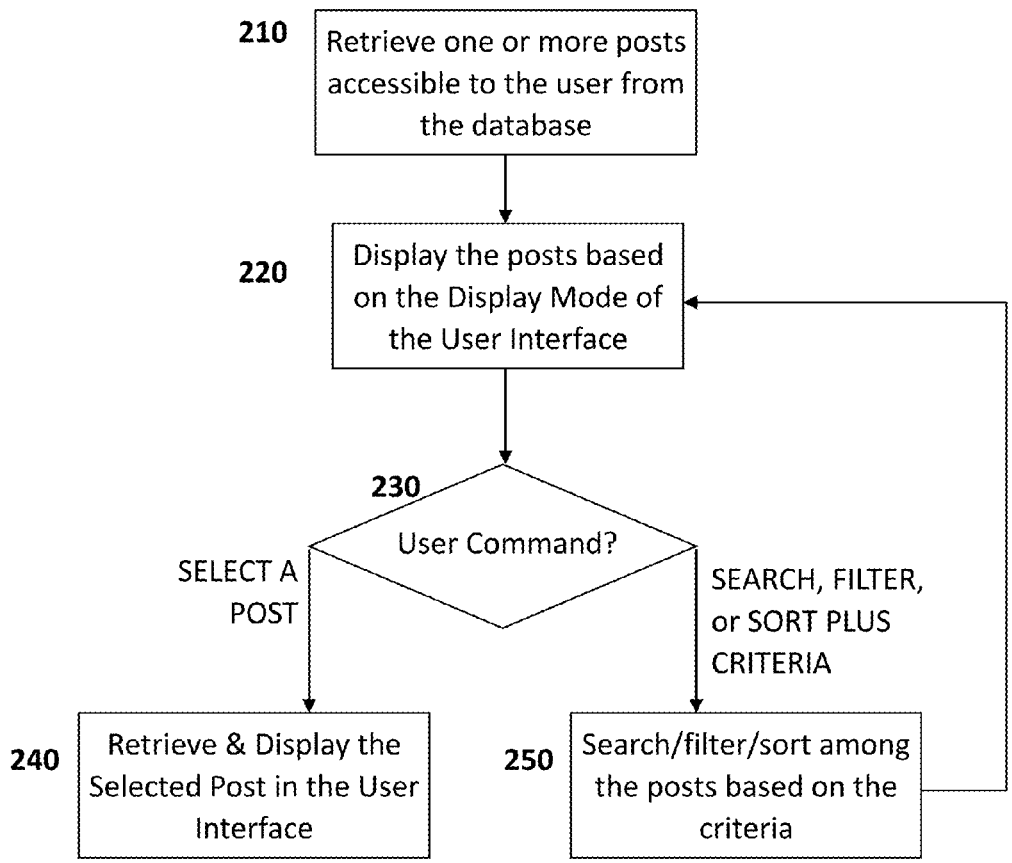
FIG. 5 shows a flow chart of another embodiment for displaying one or more posts a user is allowed to access in a user interface.

Now that at least a post is published, FIG. 5 illustrates the flow chart of a preferred embodiment of the method for displaying one or more published posts that can be accessed by a user. In this embodiment, the posts accessible to the user are first retrieved from the database in step 210. After the accessible posts are determined, the posts are then displayed in step 220 in a user interface associated with the user based on the display mode of the user interface, either predetermined by the user or a system. If the user selects a post to view in step 230, the post and its contents are shown in step 240 in the user interface in the original window as in this embodiment, or alternatively in a new window or a new tab of a browser. If the user would like to search, filter, or sort among the accessible posts with some criteria in step 230, then the result of the searching, filtering, or sorting performed in step 250 is again shown in the user interface based on the display mode in step 220.

Figure 6:
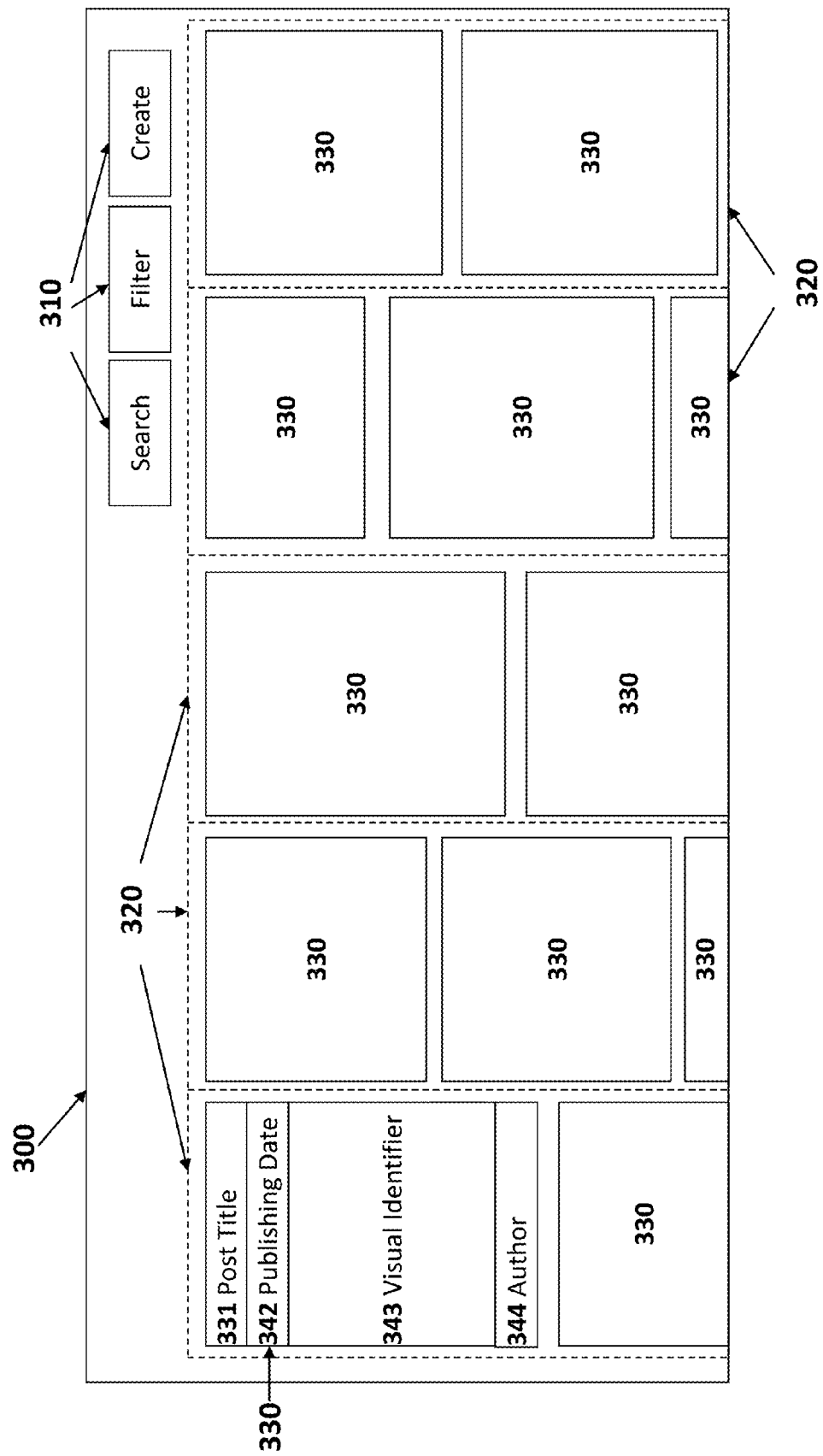
FIG. 6 shows a user interface of an embodiment for browsing posts accessible to a user in a tile mode.
Figure 7:
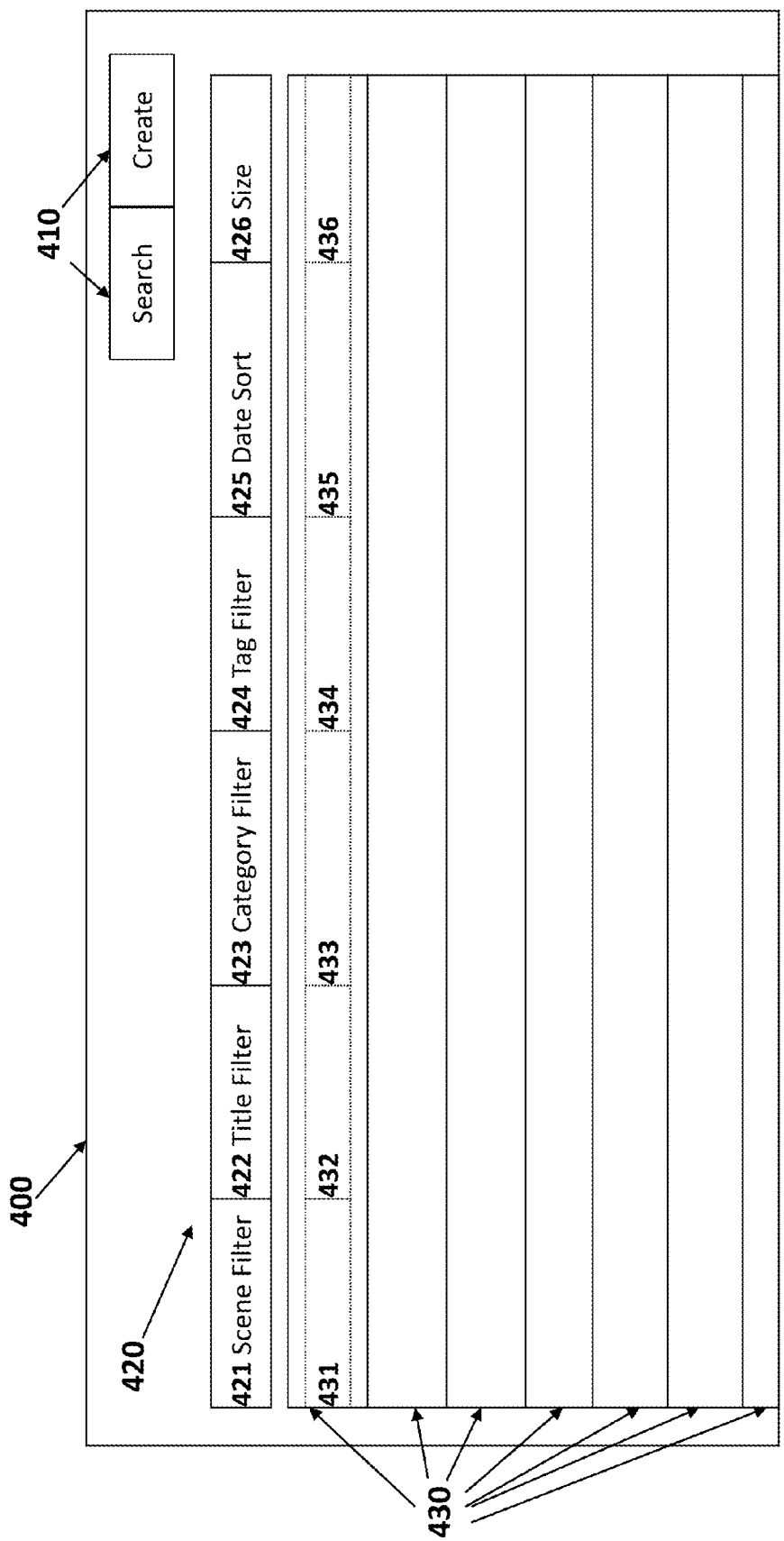
FIG. 7 shows a user interface of an embodiment for browsing posts accessible to a user in a detailed mode.

The user interface in this embodiment has two display modes: a tile mode as illustrated in FIG. 6 and a detailed mode shown in FIG. 7. The exemplary user interface in its tile mode 300 has three controls 310—"Search," "Filter," and "Create." The search control allows the user to enter at least a keyword or a Boolean or natural language search query for searching among the posts accessible to the user. Depending on the implementations, the search control may search through only certain features of the posts or all searchable features such as the titles, texts, images, icons, and tags in the posts 330 and determine whether a post is a hit based on a search relevance mechanism known in the art. Alternatively, the search control may incorporate an existing search engine such as a Google™ customized search engine. In an alternate embodiment, the search control may in addition adopt an image recognition mechanism for identifying objects in an image, icon, or video in a post and further use the identified objects to determine how relevant a post is to the search query.

Moreover, the filter control allows the user to select among all existing values of post features to filter out the posts that do not have the specific features. For instance, the filter control may list all tags: fight, boxing, and voting, and categories: entertainment, sports, and politics, of the accessible posts for the user to choose from, and if the user selects a value "fight" from the tags, the embodiment finds among the accessible posts that have "fight" in their tags. The create control allows the user to create a new post, just as in the preferred embodiments for editing online posts described above.

In this preferred embodiment, the user interface in its tile mode 300 further comprises a plurality of columns 320 for placing the tiles 330 of posts accessible to the user. Each column 320 of this user interface 300 has the same width, and the number of columns 320 in this user interface 300 can be dynamically changed according to the user's screen size or the size of the window for the user interface 300. Every tile 330 in this user interface 300 is located in a column 320 and aligned vertically toward the top of the column 320. In this user interface 300, the tile 330 of a post includes the title 331 of the post, the publishing date 332, the visual identifier 333, and the author 334 of the post. The author 334 of a tile 330 in this embodiment includes the post author's icon and account ID.

Additionally, every tile 330 has the same width, and its visual identifier 333 is sized proportionally to fit in the tile 330. Since the visual identifier 333 of each tile 330 may not be of the same height-width ratio, after resizing to be of the same width, the tiles 330 in the user interface 300 may have various heights as shown in FIG. 6. In order to show more tiles 330 in the user interface 300, the tiles 330 are aligned upward in order to save space so that the user can easily compare the posts based on the visual identifiers 333 or other features shown in the tiles 330 and find the posts that seem most interesting.

Furthermore, the user interface of this preferred embodiment has a detailed mode 420. In the detailed mode, the user interface 420 has various controls 410 & 420 for searching, creating, filtering, and sorting among the posts accessible to the user. Like in the tile mode in FIG. 6, the search control 410 allows the user to search among the posts with any keywords. The filter controls 421-424 are used to filter the posts based on their authors/groups (named "scenes" in this embodiment), titles, categories, and tags. This user interface in the detailed mode 400 additionally provide sort controls 425 and 426 for the user to rearrange the order of the posts displayed based on their publishing dates or sizes.

In this user interface 400, the posts are each represented by a row 430. A row 430 shown in this user interface 400 comprises a plurality of columns for displaying the corresponding post's author/scene 431, title 432, category(ies) 433, tag(s) 434, publishing date 435, and size 436. A row 430 may in addition have a column comprising at least a row control for bulk editing (not shown here), such as selecting, deleting, locking, sharing, and entering a comment for multiple posts. Moreover, a row 430 of this preferred embodiment may have an additional column for showing what content containers a post has by various icons of the container types.

Figure 8:
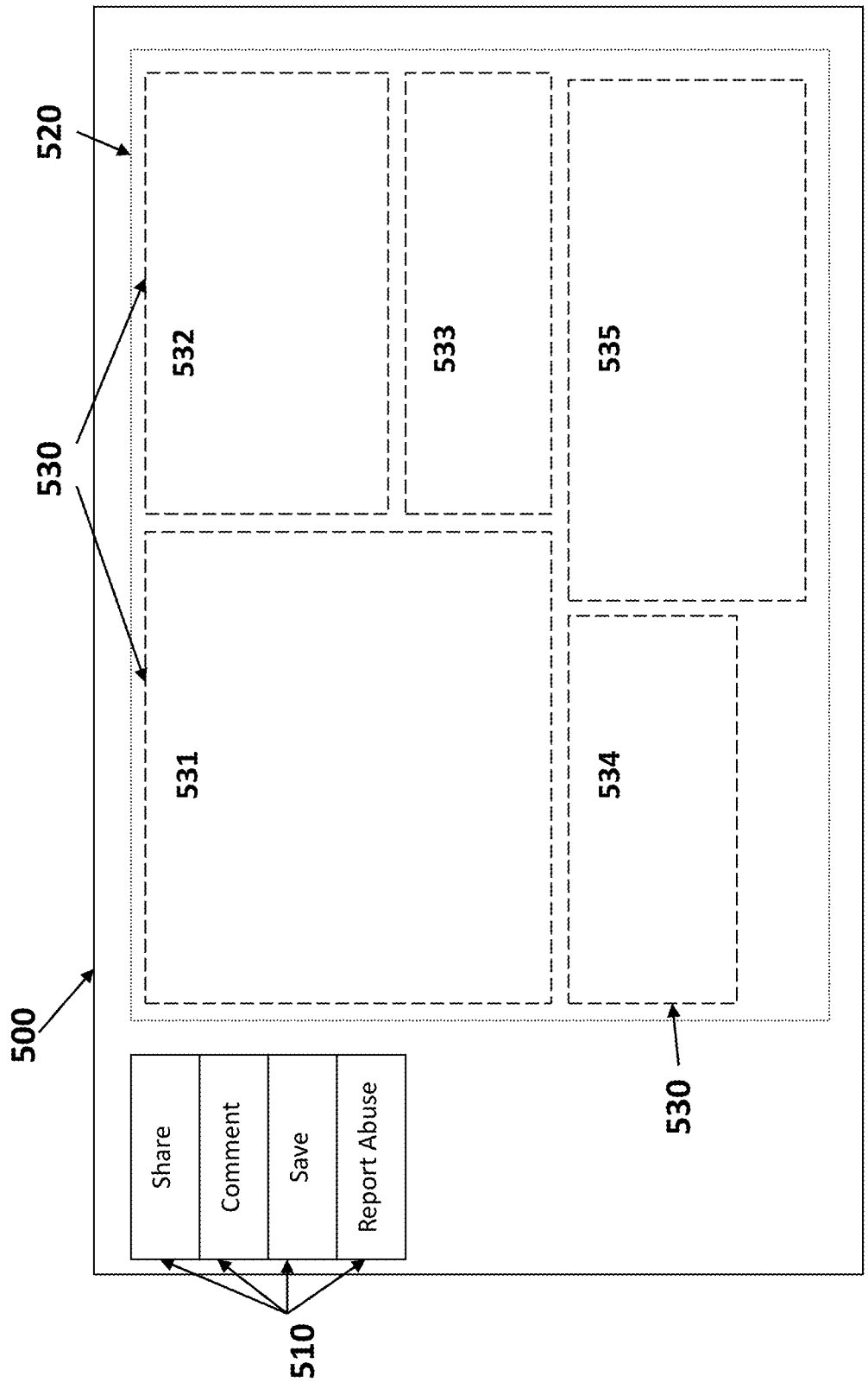
FIG. 8 shows a user interface of an embodiment for displaying a selected post.

In either the tile mode 300 or the detailed mode 400 of this preferred embodiment, when a user selects a post for viewing, a user interface 500 in FIG. 8 is shown to display the selected post. In this embodiment, the user interface 500 has four controls 510—"Share," "Comment," "Save," and "Report Abuse." The share control 510 in this embodiment allows the user the share the post with others via various sharing means such as other online networking websites, emails, or RSS feeds. The comment control 510 allows the user to add a comment to the post. The save control 510 allows the user to save the post to his/her private storage in the embodiment. The report abuse control allows the user to report to a system administrator that the post violates at least a system policy, such as containing a racial discriminatory content, an adult content, and so forth.

In this embodiment, the post 520 is displayed with its content containers 530 laid out as they were by the author. The contents of the containers 530 have content bodies and locations like those in the post editing embodiments described above. For example, for a container 531 with a content associated with a video file either uploaded to the database of this embodiment or stored remotely in a third-party database, the container is displayed with an embedded video player for playing the video file. The user can play the video file by controlling the embedded video player. For a container 532 with a content associated with an image file, the container is displayed with a thumbnail of the image file. If the user selects the image container 532, the image file is downloaded for display in another user interface of the embodiment in a new window. For a container 534 with a plurality of contents each associated with an uploaded image file, the container 534 is displayed with an array of thumbnails of the image files. If the user selects the image container 534, the image files are downloaded for display one by one in another user interface of this embodiment in a new window. The containers 530 displayed in this user interface 500 may in addition show their titles or other features along with the contents.

A post in a preferred embodiment may comprise an activated self-destruct timer set by the author for automatically deleting the post along with its uploaded contents from the system after the timer expires. Preferably, the user interface 300, 400, or 500 shows an indication of an activated self-destruct timer of the post, such as an icon on a corner of a tile 330, a row 430, or an opened post 520. The user interface for viewing the post 500 may in addition shows the time left for the opened post 520 next to the indication of the timer.

Furthermore, the user interface of the preferred embodiment 300 or 400 periodically checks with the database and deletes the representation of the post (the tile 330 or the row 430) from view after the post is deleted by the author or the post's self-destruct timer so that the user would not be viewing and probably attracted to a post that is no longer available. Similarly, since the user interface of the embodiment 300 or 400 periodically checks with the database, newly published posts can be updated for display too. If the post being deleted is being read by the user, the embodiment preferably closes the user interface for reading the post 500 and brings the user back to the user interface for browsing 300 or 400.

Another preferred embodiment additionally comprises a statistics tool for showing how popular or unpopular an author's posts are for the author (with an advanced/enterprise account) to determine the effectiveness of its marketing campaign through this post or even on this site. As stated above, the statistics tool may collect information concerning at least one of the following factors to determine the popularity of a post: how often the post is selected for display, how often the post is saved, how often the post is forwarded, how many comments are added in response to the post, how the post is rated, and so forth. The preferred embodiment may provide the statistics directly to the author for the author to analyze. Alternatively, the statistics may be collected to be analyzed by a third-party server or by an existing data mining module incorporated in an embodiment.

Another preferred embodiment may also comprise a statistics tool for calculating a popularity of each post in the database based on the factors stated above. The user interface associated with a user of this embodiment displays the posts accessible to the user in a descending order of popularity. An alternate embodiment may display the posts in a reverse chronological order. Another embodiment may display the posts in an order based on the user preference ratings as described above. Yet another embodiment may display featured posts of the week, such as advertisements, above all other posts.

While the invention has been described by means of specific embodiments, numerous modifications and variations could be made thereto by those ordinarily skilled in the art without departing from the score and spirit disclosed herein. For instance, a user interface of an embodiment for displaying one or more online posts may separately display private and public posts or simply add a specific control for the user to filter the posts based on the privacy settings. The number of features a post has or the features of the post shown in a user interface may vary according to the implementations. The numbers and types of post controls or container controls for different embodiments may be different. The types of content containers supported may vary as well.

The invention claimed is:

1. A system for editing and publishing an online post, the system comprising a server having a user interface associated with an authorized user and communicably coupled to a database, the server being configured to:
   (a) create a post based on a user command received from the user interface, the post having a plurality of non-overlapping content containers, each container comprising:
      (i) a plurality of features comprising:
         (I) a container type comprising at least one type-specific control;
         (II) at least one content having a body and a link capable of being associated with a file stored in the database at a file location;
         (III) a container position in the post; and
         (IV) a container dimension,
      (ii) a container type control configured to change the container type based on the user command,
      (iii) a feature control configured to change at least one of the features other than the container type based on the user command,
      (iv) a saving control configured to save the container to the post, and
      (v) a deleting control configured to delete the container from the post;
   (b) for the at least one content, generate the link of the content, the link uniquely pointing to the file while being different from the file location, if the content is associated with the file;
   (c) when a first container is moved which causes an overlap with at least one second container, automatically update the container position of the at least one second container in order to avoid the overlap; and
   (d) save the post to the database and publish the post with a tile, the tile comprising a visual identifier that is capable of being independent from the contents.

2. The system of claim 1, wherein the post further comprises a self-destruct timer configured to delete the post from the database at a timeout after the timer is activated.

3. The system of claim 1, wherein the server is further configured to vertically align the containers to a top of the post.

4. The system of claim 1, wherein when the user command affects at least one of the features of a container which would result in a width of the post exceeding a predetermined maximum width, the server is further configured to automatically change the features of at least one container in order to ensure the width of the post not exceeding the maximum width.

5. The system of claim 1, wherein the post further comprises a password, and the post can be accessed only when the password is used to unlock the post.

6. The system of claim 1, wherein when the post is being edited by the user, the server is further configured to request a user authentication after a predetermined Idle timeout.

7. The system of claim 1, wherein the visual identifier of the tile is selected from a group consisting of one or more preexisting graphics, an icon automatically generated by the server based on the contents, and an image to be uploaded by the user.

8. The system of claim 1, wherein the server is further configured to automatically designate in the post a primary content, and generate the visual identifier of the tile of the post based on the primary content.

9. The system of claim 8, wherein the primary content is a first image file uploaded to the database in the post and the visual identifier of the tile of the post is a thumbnail of the primary content.

10. The system of claim 1, wherein the database further comprises a least a storage device selected from a group consisting of a cloud storage, a server storage device, a user storage device, or combinations thereof.

11. The system of claim 1, wherein the at least one content of a content container further comprises a visual identifier associated with the body.

12. The system of claim 11, wherein the visual identifier of the content is a numeral representing a sequence of the content in the content container.

13. The system of claim 1, wherein if the content is associated with the file, before the post is published, the body of the at least one content further comprises an embedded preview code capable of triggering a new window for displaying the file as if the post was published.

* * * * *